3,461,405
DRIVEN INVERTER DEAD-TIME CIRCUIT
John D. Bishop, Basking Ridge, Murray R. Hasson, Dover, and Fred V. Kadri, Madison, N.J., assignors to Bell Telephone Laboratories, Incorporated, Murray Hill, N.J., a corporation of New York
Filed Sept. 11, 1967, Ser. No. 666,644
Int. Cl. H03k 3/281
U.S. Cl. 331—113       5 Claims

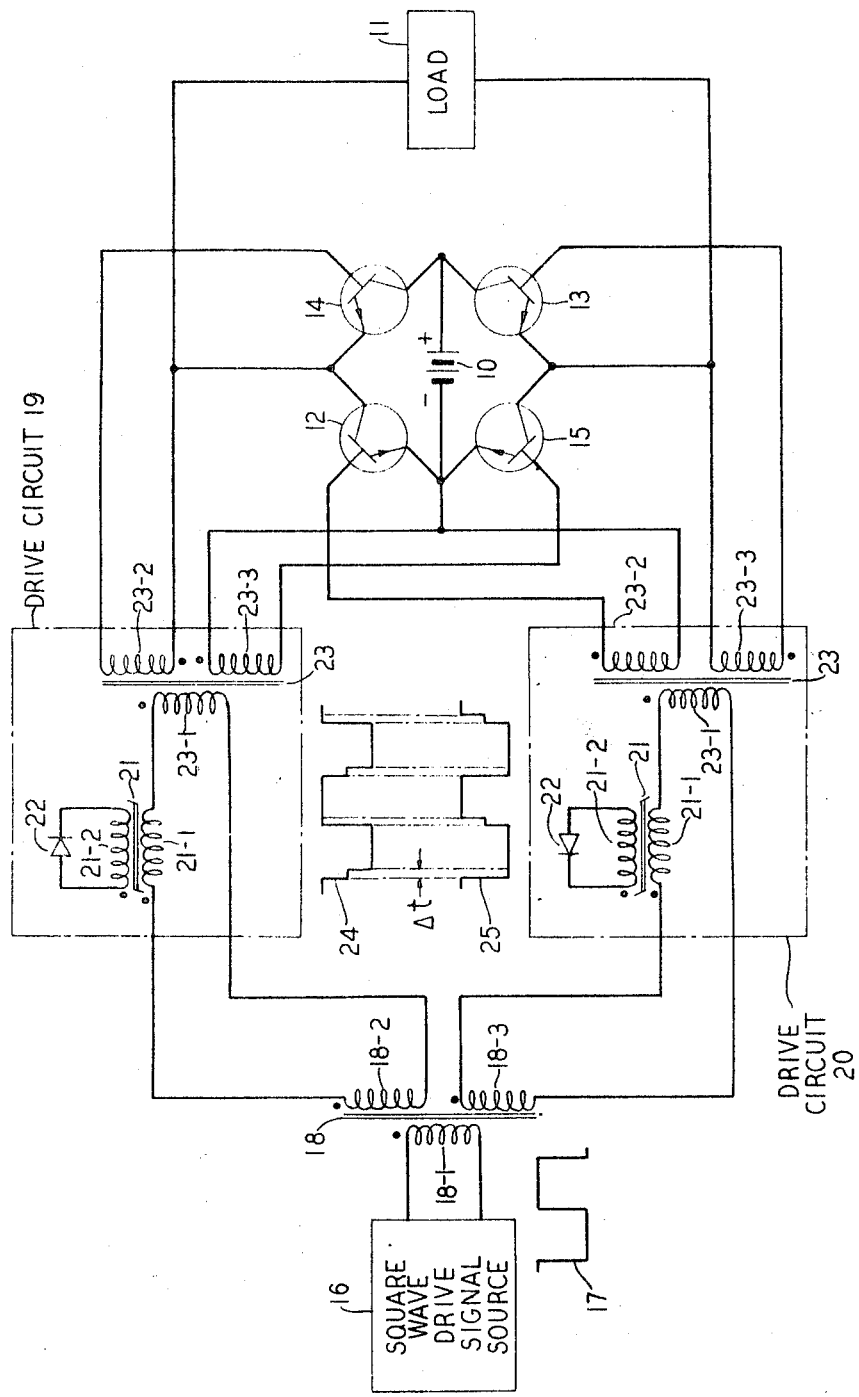

ABSTRACT OF THE DISCLOSURE

In a driven inverter which utilizes at least two switching transistors conducting alternately and in phase opposition to one another each transistor has its own drive circuit which includes a serially connected primary winding of a saturable core transformer. A diode connected across the secondary winding of the saturable core transformer is poled to present an effective short circuit during a transistor turn-off signal while presenting an effective open circuit during a turn-on signal. As a result, a delay in transistor turn-on is provided while the turn-off signal wavefront is preserved to allow fast and efficient switching transistor turn-off, thereby preventing the simultaneous conduction of out-of-phase transistors.

Background of the invention

The invention relates generally to driven transistor inverters and, more specifically, to driven inverter drive circuits which prevent the simultaneous conduction of oppositely phased switching transistors.

In driven inverters which use at least two transistors (or groups of transistors conducting in phase with one another), normally one transistor conducts while the other transistor is turned off. A momentary, undesirable condition, called switch-through, where both transistors conduct simultaneously may arise due to inherent component and circuit characteristics. Such a switch-through condition may cause excessive power loss or, in worst case, may result in switching transistor failure. Inverters which operate at high switching frequencies are particularly subject to the detrimental effects of such switch-through conditions.

A primary object of the invention is to eliminate switch-through conditions in driven inverters.

Another object of the invention is to increase the efficiency of driven inverters.

Summary of the invention

To fulfill these objects of the invention individual drive circuits are provided for each of the switching transistors of a driven inverter and a saturable core transformer, having a diode connected across its secondary winding, is inserted in series with the primary winding of each of the drive circuits.

More specifically, in one embodiment of the invention a bridge type driven transistor inverter utilizes a separate drive circuit for each one of the two transistor pairs which are connected in opposite arms of the bridge circuit and which conduct together in phase, where the drive circuits derive their square-wave drive signal from a common square-wave drive signal source. Each of the drive circuits has the primary winding of a saturable core transformer connected in series with the input series and with the primary winding of a drive transformer which couples the drive energy via its secondary windings to the emitter-base circuits of the individual transistors. The square-wave drive signal, together with the properly phased coupling transformers, causes the transistor pairs in opposite arms of the bridge to alternately conduct in phase opposition to each other to deliver a square-wave output current to a load connected across the bridge. Each of the saturable core transformers, in turn, has a diode connected across its secondary winding, where the diode is poled to present an effective open circuit when a turn-on signal is applied to the respective transistor, while presenting a short circuit when a turn-off signal is applied instead.

As a result, the saturable core transformer exhibits saturable core characteristics only during the turn-on portion of the drive signal while preserving the steep turn-off signal wavefront, thereby allowing fast and efficient switching transistor turn-off coupled with a sufficient delay of transistor turn-on t oprevent a switch-through condition from being created.

Brief description of the drawing

The single figure of the drawing is a schematic diagram of a bridge type driven inverter which has a saturable core transformer with a diode across its secondary winding connected in the individual switching transistor drive circuits.

Detailed description

In the bridge inverter illustrated in the single figure of the drawing the current obtained from D.C. source 10 is converted to a square-wave current to be supplied to load 11. The switching of the D.C. input takes place in a bridge circuit comprising n-p-n transistors 12 through 15. The bridge circuit is formed by connecting the emitter electrodes of transistors 12 and 15 together and by connecting the collector electrodes of transistors 13 and 14 together, while the emitter electrode of transistor 14 is connected to the collector electrode of transistor 12 and the emitter electrode of transistor 13 is connected to the collector electrode of transistor 15. Source 10 is connected across one diagonal of the bridge by having its negative terminal connected to the juncture of the emitter electrodes of transistors 12 and 15 and having its positive terminal connected to the juncture of the collector electrodes of transistors 13 and 14. Load 11 is connected across the other diagonal of the bridge which is formed by the juncture of the collector electrode and emitter electrode of transistors 12 and 14, respectively, and the juncture of the emitter electrode and collector electrode of transistors 13 and 15, respectively.

The basic drive signal for the inverter is derived from square-wave drive signal source 16. Any one of a variety of square-wave sources which are well known in the art may be used as the square-wave drive signal source 16 having an output waveform 17. One particular example of such square-wave drive signal source is an astable multivibrator as described in section 11–14 of "Pulse, Digital, and Switching Waveforms" by J. Millman and H. Taub, published in 1965 by McGraw-Hill. The output of source 16 is coupled to primary winding 18–1 of transformer 18 to provide the drive signal for transistors 12 to 15 through secondary windings 18–2 and 18–3 and drive circuits 19 and 20, respectively. Each of the drive circuits 19 and 20 comprises a saturable core transformer 21, having a diode 22 connected across its secondary winding 21–2, together with a drive transformer 23 having a primary winding 23–1 and secondary windings 23–2 and 23–3. In each of the drive circuits 19 and 20, one terminal of primary winding 21–1 of transformer 21 is connected to one terminal of primary winding 23–1 of transformer 23. Secondary winding 18–2 of transformer 18 is connected in series with primary windings 21–1 and 21–3 of drive circuit 19, while secondary winding 18–3 is connected in series with windings 21-1 and 21-3 of drive circuit 20. Secondary windings 23-2 and 23-3 of drive circuits 19 and 20 are connected to the emitter-base circuits of transistors 12, 13 and 14, 15, respectively, by connecting the respective winding between the base and emitter electrodes of a corresponding transistor.

The windings of the several transformers of the inverter have been marked with dots to indicate the polarity relationship of the various drive signals as they are coupled through the transformers. Thus, an input signal of a certain polarity applied to the dot-side of a primary winding produces an output signal of the same polarity at the dot-side of a secondary winding of the same transformer. Waveforms 17, 24, and 25 illustrate the resulting polarity relationship of the signals.

In the operation of the driven inverter the square-wave drive signal obtained from source 16 causes the pairs of transistors 12, 13 and 14, 15 to conduct alternately and in phase opposition to one another, thereby supplying a square-wave current to load 11. The basic square-wave drive signal as illustrated in waveform 17 is coupled from source 16 to transformer windings 18-2 and 18-3. Transformer winding 18-2, in turn, couples a portion of the signal through saturable core transformer primary winding 21-1 and through drive transformer primary winding 23-1 to secondary windings 23-2 and 23-3 of drive circuit 19. The drive signal coupled to windings 23-2 and 23-3 of drive circuit 19 controls the conduction of transistors 14 and 15, respectively. Transformer winding 18-3, on the other hand, couples part of the drive signal through saturable core transformer primary winding 21-1 and drive transformer primary winding 23-1 to secondary windings 23-2 and 23-3 of drive circuit 20. The signal coupled to windings 23-2 and 23-3 of drive circuit 20 controls the conduction of transistors 12 and 13, respectively.

During normal operating conditions, transistor pairs 12, 13 and 14, 15 are alternately turned on together and are alternately turned off together, with only one pair of transistors conducting at any one time. Because of inherent delay and charge characteristics of some of the inverter components, however, it may occur that one pair of transistors is not yet completely cut off before the other pair of transistors is being turned on unless some special protective circuitry is incorporated in the inverter. This condition of simultaneous conduction by both pairs of transistors, called switch-through, is highly undesirable since it may cause excessive power losses or, in the worst case, may result in the failure of one or more of the switching transistors.

In the operation of the circuit of the present invention the creation of a switch-through condition is positively prevented by generating a specific delay between the turn-on of one pair of switching transistors and the turn-off of the other pair of switching transistors to assure the turnoff of one pair of switching transistors before the other pair is turned on. The required delay, or dead time, is obtained by delaying the application of the turn-on portion of the drive signal for a definite period of time after the square-wave drive signal changes its polarity in the turn-on direction. At the same time the underlayed turn-off signal is applied to the transistors which are connected in the other pair of bridge arms, thereby allowing fast and effective turn-off of those transistors.

In the embodiment of the invention illustrated in the drawing the required delay for the alternately conducting transistor pairs is generated in drive circuits 19 and 20 through the cooperation of saturable core transformer 21 with diode 22 which is connected across its secondary winding 21-2. The resulting effect on the drive signal is illustrated by waveforms 17, 24, and 25, respectively.

In the operation of the driven inverter illustrated in the drawing, square-wave drive signal source 16 generates as its output the square-wave drive signal 17 which is applied through secondary windings 18-2 and 18-3 to drive circuits 19 and 20, respectively. The drive circuits, in turn, act to modify the basic square-wave drive signal 17 to generate waveforms 24 and 25 which are then used to control the conduction of the respective switching transistors.

When the applied square-wave drive signal 17 is negative during its initial half cycle, for instance, it forward biases transistors 14 and 15, while it turn off transistors 12 and 13. During the next half cycle the drive signal reverses its polarity and, consequently, turns off transistors 14 and 15, while turning on transistors 12 and 13 instead. This sequence is continually repeated as long as the square-wave drive signal 17 is being applied from source 16, thereby generating the square-wave output current through load 11.

A significant difference, however, may be noted between waveforms 24 and 25 which are generated in drive circuits 19 and 20, respectively, and which are derived from the basic square-wave drive signal 17. That is, waveform 24 displays a step delay on the leading edge of each negative going square wave, while waveform 25 displays a similar step delay on the leading edge of each positive going square wave. In the following discussion the respective signal polarities appearing across particular transformer windings are considered in the light of the previously discussed winding polarities. Specific signal polarities are indicated as existing at the dot-side terminal of a particular transformer winding with respect to the other terminal of the same transformer winding.

In the operation of the inverter the negative going input signal is coupled from primary winding 18-1 to secondary windings 18-2 and 18-3, thereby generating a negative going signal in the respective secondary windings. The outputs of the secondary windings 18-2 and 18-3, in turn, are applied to drive circuits 19 and 20, respectively; that is, the drive signal is now applied across the series combination of primary windings 21-1 and 23-1 of saturable core transformer 21 and drive transformer 23, respectively, which are part of drive circuits 19 and 20. The output of drive circuits 19 and 20 is then coupled through the respective drive transformer secondary windings 23-2 and 23-3 to the corresponding switching transistors to control their conduction.

Each of the saturable core transformers 21 of drive circuits 19 and 20, however, has a diode 22 connected across its respective secondary winding 21-2. Diode 22 of drive circuit 19 has its anode connected to the dot-terminal of secondary winding 21-2, while its cathode is connected to the other terminal of the same secondary winding. Diode 22 of drive circuit 20, on the other hand, has its cathode connected to the dot-terminal of secondary winding 21-1, while its anode is connected to the other terminal of the same secondary winding.

As the negative drive signal is applied from secondary winding 18-3 across windings 21-1 and 23-1 of drive circuit 20, a negative signal tends to be induced in secondary winding 21-2. Because of its particular connection across secondary winding 21-2, diode 22, however, presents an effective short circuit across the winding. The short circuit across secondary winding 21-2, in turn, renders the primary winding of transformer 21 a short circuit, thereby nullifying the effect of the saturable core transformer 21. As a result, the voltage appearing across secondary winding 18-3 is directly applied across primary winding 23-1 of drive circuit 20 without any effect on the leading edge of the square wave as illustrated by waveform 25. Consequently, transistors 12 and 13 are being turned off efficiently and without any delay.

The negative signal coupled to secondary winding 18-2 is similarly applied across the series combination of windings 21-1 and 23-1 of drive circuit 19, with the result that a negative signal is induced in secondary winding 21-2 of saturable core transformer 21. Diode 22 of drive circuit 19, however, has its anode connected to the dot-terminal of winding 21-2, so that the diode presents an open circuit to the induced voltage. Consequently, primary winding 21-1 of transformer 21 effectively presents an open circuit to the applied voltage from winding 18-2. As a result all of the applied voltage is dropped across winding 21-1, with no voltage being developed across winding 23-1. As pointed out previously, transformer 21 is of the saturable core type; that is, it has such magnetization and such volt-second characteristics that a predetermined time interval after a voltage has been applied to the transformer will saturate and thereafter present an effective short circuit. Consequently, transformer 21 of drive circuit 19 presents a short circuit to the input signal the instant it saturates and the entire input signal from winding 18-2 is thereafter applied to primary winding 23-1 of drive transformer 23 to turn on transistors 14 and 15.

The particular saturable core transformer/diode arrangement of the present invention provides for an additional advantage by eliminating the dependency of the dead-time duration on the core material flux saturation level. That is, during the period when a particular switching transistor is back biased, the corresponding diode is forward biased, thereby limiting the voltage drop across the saturable core transformer. Since the resetting of the saturable core transformer occurs during this time, however, it is evident that the readily controllable diode characteristic rather than the core material flux saturation level controls the reset level and, hence, the dead time of the circuit.

As a result of the saturation characteristics of transformer 21, the turn-on of transistors 14 and 15 is delayed from the turn-off of transistors 12 and 13 by a time interval $\Delta t$ as illustrated by waveforms 24 and 25.

The delay interval $\Delta t$ effectively creates a dead time between the turnoff of transistor pairs 12 and 13 and the turnon of transistor pairs 14 and 15 which assures that at any one particular time only one or the other pair of transistors conducts, thereby positively preventing the occurrence of a switch-through condition.

The above-described generation of a delay $\Delta t$ by the inverter is repeated each half cycle as indicated by waveforms 24 and 25, except that drive circuits 19 and 20 alternately change their functions. That is, during the first negative half cycle drive circuit 19 functions to generate the delay $\Delta t$ in the turn-on signal, while drive circuit 20 allows the unaltered application of the turn-off signal. In the following half cycle the roles of drive circuits 19 and 20 are interchanged; that is, drive circuit 20 generates the required delay for the turn-on signal of transistors 14 and 15, while drive circuit 19 allows the unaltered application of the turn-off signal for transistors 12 and 13.

It is to be understood that the above-described arrangement is illustrative of the application of the principles of the invention. Numerous other arrangements may be devised by those skilled in the art without departing from the spirit and scope of the invention.

We claim:

1. A driven converter which utilizes at least a first and a second switching transistor and which comprises a first and a second drive circuit for said first and second transistors, respectively, whereby said first and second transistors are alternately rendered conductive and nonconductive in phase opposition to each other, means to generate a square wave drive signal, means to apply said square wave drive signal to said first and second drive circuits, said first drive circuit coupling said square wave drive signal to said first transistor, said first transistor oriented to permit one polarity of said drive signal to bias it into conduction, said second drive circuit coupling said square wave drive signal to said second transistor, said second transistor oriented to permit the opposite polarity to said one polarity of said drive signal to bias it into conduction, a first and a second saturable core transformer each having its primary windings connected in said first and second drive circuits, respectively, a first diode being connected in a secondary winding of said first saturable core transformer with a polar orientation to be nonconductive in response to said one polarity of said drive signal, a second diode being connected in a secondary winding of said second saturable core transformer with a polar orientation to be nonconductive in response to said opposite polarity of said drive signal whereby said first and second diodes delay the application of said drive signal to forward bias said first and second transistors into conduction, respectively, until after the respective one of said saturable core transformers has saturated.

2. A driven inverter in accordance with claim 1 which includes an input transformer having a primary winding connected to receive said drive signal and a pair of secondary windings, and a first and a second drive transformer each having a primary winding and a pair of secondary windings, and in which said first and second drive circuits include a respective one of the secondary windings of said input transformer and the primary winding of a respective one of said drive transformers, each of the secondary windings of said drive transformers being connected to the emitter-base path of a respective one of said transistors.

3. A driven inverter in accordance with claim 2 which comprises a bridge inverter circuit including four transistors and having at least one of said transistors connected in each one of the arms of the bridge circuit, the ones of said transistors in opposite arms of said bridge being connected to a common drive circuit, whereby the ones of said transistors in one pair of opposite arms of said bridge are together rendered alternatively conductive and nonconductive in phase opposition to ones of said transistors in the other pair of opposite arms of said bridge.

4. A driven inverter in accordance with claim 3 in which, in each of said drive circuits, the secondary winding of said input transformer is connected in series with the primary windings of said saturable core and drive transformers.

5. A driven inverter in accordance with claim 3 in which the secondary windings of each of said drive transformers are connected to transistors in respectively opposite arms of said bridge circuit.

References Cited

UNITED STATES PATENTS

| 2,821,639 | 1/1958 | Bright et al. | 331—113 |
| 3,323,075 | 5/1967 | Lingle | 331—113 |

JOHN KOMINSKI, Primary Examiner

U.S. Cl. X.R.

307—317; 321—2; 331—110